(No Model.)
C. J. HUBBELL.
PRIMARY BATTERY.
No. 530,485. Patented Dec. 4, 1894.
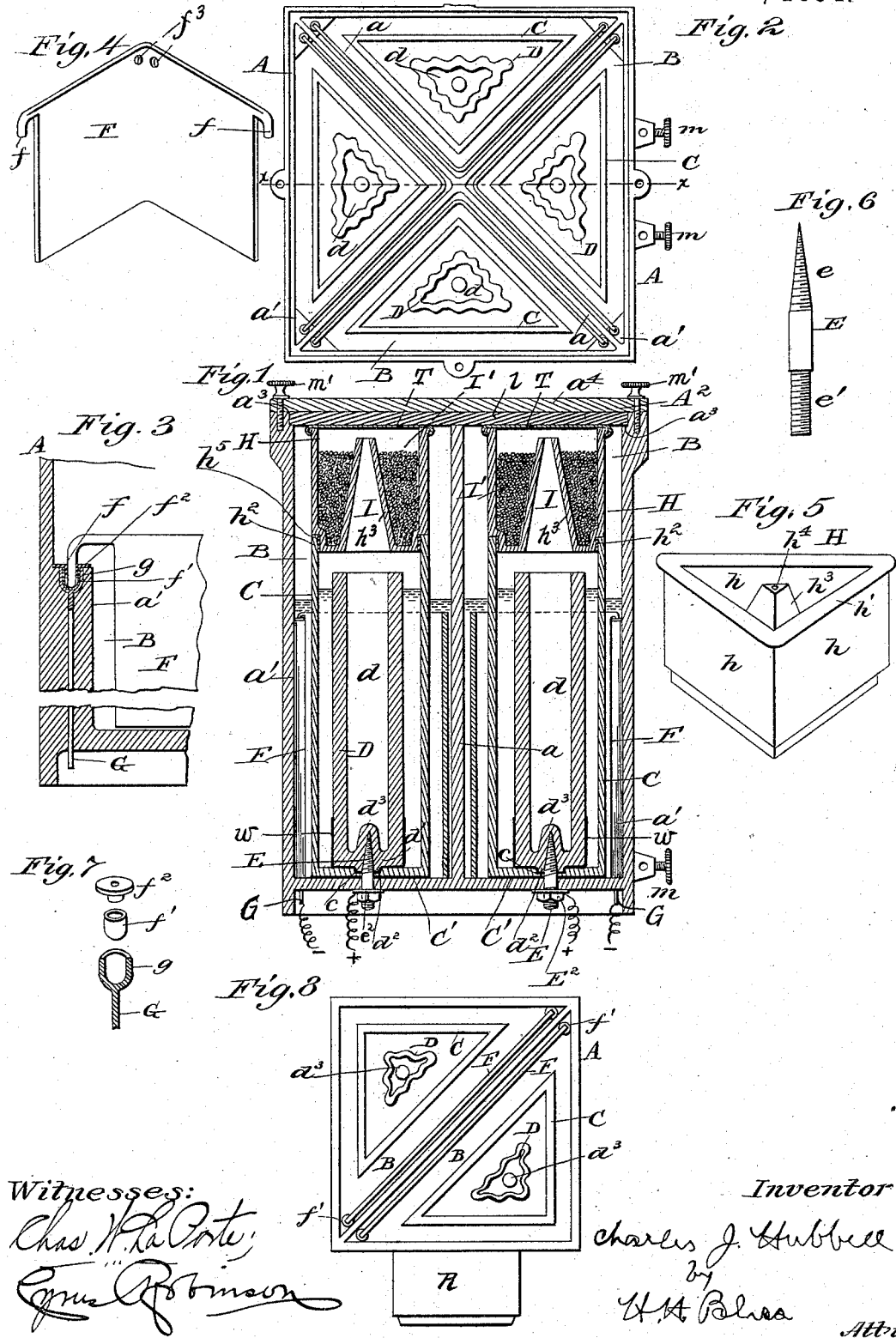

UNITED STATES PATENT OFFICE.

CHARLES JONES HUBBELL, OF NEW YORK, N. Y., ASSIGNOR TO J. J. DARLINGTON, TRUSTEE, OF WASHINGTON, DISTRICT OF COLUMBIA.

PRIMARY BATTERY.

SPECIFICATION forming part of Letters Patent No. 530,485, dated December 4, 1894.

Application filed April 30, 1894. Serial No. 509,441. (No model.)

*To all whom it may concern:*

Be it known that I, CHARLES JONES HUBBELL, a citizen of the United States, residing at New York, in the county of New York and State of New York, have invented certain new and useful Improvements in Primary Batteries; and I do declare the following to be a full, clear, and exact description of the invention, such as will enable others skilled in the art to which it appertains to make and use the same, reference being had to the accompanying drawings, and to the letters of reference marked thereon, which form a part of this specification.

The main object of my invention is to provide a simple, compact, battery which may be used for any of several purposes, as for lamps for firemen, miners, bicycles, &c. I am aware of the fact that secondary or storage batteries have been heretofore used for the above purposes; but several objections are incident to them. Much time is consumed in charging such batteries from the dynamos, each charging requiring not less than six to eight hours. They are very heavy and difficult to handle. My battery is designed to replace these. By reason of the construction and arrangement of its parts (to be hereinafter described), I am able to produce a battery having a cell or series of cells which can be charged in two or three minutes. A battery of two cells completely charged will weigh less than two pounds, can be easily handled, and will produce a current of four volts and from ten to twelve ampères in a short circuit. It will cause a low voltage lamp of three candles power (taking three and one-tenth volts) to burn from ten to twelve hours at a minimum cost not exceeding four or five cents for the entire time.

Another object of my invention is to provide a multiple cell battery in which each cell is independently provided with means for absorbing and neutralizing the fumes and gases which arise when the battery is at work. In using a multiple cell battery (where a single receptacle or pad filled with the absorbent material is depended upon to neutralize and absorb the gases and fumes which arise), I have found by experience that although a considerable part of the nitrous fumes is absorbed, yet a large proportion escapes, finding its way into the open air through the interstices between the receptacle inclosing the cells and the cover, and that another large proportion is absorbed by the electrolytic solution, thereby greatly deteriorating the latter and rendering the battery comparatively useless in a short time. This is because of the fact that the fumes have not sufficient space to escape quickly enough from the porous cup into the absorbent pad or receptacle, owing to the fact that the pad (when a single one is used) rests immediately upon said porous cups. Therefore, I provide an independent absorbent receptacle or pad for each cell which shall have a chamber for the reception of the gas, and from which it is conducted to another chamber filled with some absorbent oxidizing agent.

Another object of the invention is to provide the cell with means whereby, when the battery is tipped at an angle or completely turned over, the solutions shall be prevented from escaping from their respective chambers. In many of the batteries with which I am acquainted the porous cells are open at the top, slightly above the surface of the electrolytic fluids so that if by chance the battery is inclined the two solutions will commingle and destroy the working of the battery.

Another object is to provide double contacts or terminals for the positive element at its upper portion or top, the terminal for the negative element being at the bottom, whereby the resistance to the passage of the electric current through the positive element is reduced to a minimum.

Still another object is to obtain a perfect joint between the carbon and the porous cup, so as to prevent leakage, which object I obtain by japanning the bottom of the cup, which makes a firm joint and one that is acid proof.

A further object is to simplify the construction of the battery so that it shall be small and compact, can be easily taken apart, and can be readily emptied, cleaned, and refilled.

Figure 1 is a vertical cross section on the line $x$—$x$ Fig. 1. Fig. 2 is a plan view, the cover being removed. Fig. 3 is a partial section showing the connection of the zinc with its terminals. Fig. 4 shows in perspective one of the zinc elements. Fig. 5 shows in perspective the vessel or receptacle containing the oxidizing agent. Fig. 6 shows one of the carbon terminals. Fig. 7 shows the receptacle, the platinum contact piece, and the rubber stopper for the zinc. Fig. 8 shows a two-cell battery in slightly modified form.

Referring to the drawings,—A indicates the battery casing made of some suitable acid proof substance as hard rubber, glass, or other appropriate material, having integral therewith the interior diagonal walls $a$ $a$, which together with the wall of the casing divide it into four compartments, each adapted to contain a single cell. It will be understood that while I have shown the casing adapted to contain four cells, yet it can be constructed to contain any number as well. Into each of these triangular chambers which I designate B, B, I introduce a porous cup C, preferably triangular in cross section, resting upon a rubber disk C'. The porous cup is provided at its bottom with a recess $c$ for a purpose to be described. Within this porous cup C is mounted the carbon element D, triangular in cross section and having its exterior surface corrugated so as to present the greatest surface possible to the action of the electrolyte, it also having a central longitudinal aperture $d$ for this purpose. It has a closed bottom $d'$ provided with a circular boss $d^2$ and an interior upwardly extending circular boss $d^3$. The boss $d^2$ fits tightly into the recess $c$. The interstices or small spaces left between the walls may be sealed in any of the ordinary ways; but I prefer to expose the under side or bottom of the porous cup (after the carbon element has been put in place) to a japanning process which tightly fills the joint, renders the bottom of the porous cup acid proof, prevents any possibility of leakage, and overcomes the tendency of the carbon to exert a capillary action by reason of its porosity.

As heretofore constructed, beeswax, asphalt, and pitch have been used to seal the joint between the porous cup and the carbon, but I have found that after these materials as commonly applied have been exposed to the action of the electrolyte for a short time they disintegrate and there results not only a leakage of the liquids but also an oxidizing of the electrode beneath. By dipping the bottom of the carbon into a japanning compound, so as to coat at $w$ the boss $d^2$ and the exterior surface up to the top of the terminal, then inserting it into place in recess $c$, then coating also the bottom of the cup C with the same compound, and then baking them as is ordinarily done in the japanning process, I produce a joint which prevents leakage, is proof against the action of acid, and prevents any oxidizing of the terminal, the pure metal of which should be permanently in contact with the carbon.

The japan which I prefer to employ, consists of a mixture of pure beeswax and Trinidad asphalt, in the proportion of three parts of the beeswax to two parts of the asphalt. The carbon is dipped in this mixture to coat it as above described, paraffine, or similar material, being placed upon the terminal E to prevent the japan from adhering thereto. The bottom of the porous cup where the carbon is to be received is also supplied with a coating of this japan, as above indicated. The operation of baking under high temperature hardens and affects the japan in such a manner as to render it impervious to the attacks of the acid, and prevents capillary action or leakage of the electrolyte.

E is a copper terminal screwed or carefully inserted into the boss $d^2$ and the bottom of the carbon, in such way as not to crack or break it. It is preferably formed with a tapering wood-screw-thread $e$ on one end, and a machine thread $e'$ on the other end. This terminal serves two purposes; first, it furnishes a connection for the carbon, and, secondly, it fastens or secures the porous cup C and the carbon element therein tightly to the bottom of the cell chamber B. The casing A is provided with a small aperture for the passage of this part E, and the latter has a nut $E^2$ which is tightly screwed against a washer $e^2$, that prevents leakage from the cell chamber. The terminal is applied to the carbon after the latter is baked, preferably in the following manner: The point of the wood screw is brought in contact with the end of the carbon, and is turned alternately to the right and left, forcing its passage into the carbon until it becomes tightly and closely seated therein. Heretofore terminals have sometimes been embedded in the carbon before baking, but this practice is not practical for the reason that the high temperature of the baking process injures the metal of the terminal, and for the reason that the metal and carbon do not have the same coefficients of expansion, resulting in an imperfect joint.

The zinc element is preferably formed as shown in Fig. 5, that is to say, is formed of a sheet of zinc F bent into the angle shown and provided at its upper corners with projections $f$, $f$ and also preferably with the small handle openings $f^3$ for convenience in handling. This zinc plate fits comparatively closely against the diagonal walls $a$ although there is space between it and them for the circulation of the electrolyte. The copper terminals G for the zinc, (there being two for each zinc, one on either side) extend downward through an inwardly projecting portion $a'$ of the walls of the casing A, the latter serving as an insulation therefor. Each terminal is provided with a cup-like receptacle $g$ at the upper end adapted to receive one of the projections $f$, these parts being so related that the zinc F can at any time be readily put in or withdrawn from its place in the cell. The projections $f$ can be either formed by cutting away the plate of zinc or by attaching suitably shaped pieces thereto. Preferably I attach them by the process of electric welding in order to obtain a union so intimate that corrosion of the joined surfaces will be prevented. The contact ends of the projections $f$ are armed with platinum caps or pieces $f'$, these being so shaped and of such dimensions as to fit snugly in the cups or receptacles $g$.

By the internal location of the terminals, as above described, it will be seen that they are not only concealed and out of the way, but, being below the surface of the electrolyte, they permit the zinc plate to be supported considerably below the upper edge of the porous cup, so that it may be completely immersed in the electrolyte. It will be further observed that the arrangement of the terminals is such as to effectually guard against any leakage at such points, they being also independent of the top or cover of the casing.

In order to shut out the solution from the receptacle, I employ covers for the cups, these being preferably flanged rubber thimbles or disks, as at $f^2$. When the zinc is in place the rubber fits closely in the receptacle and excludes the entrance of the liquid.

It will be seen that I provide for each zinc element a double contact, one at each end of the plate F at the top thereof, and it will also be seen that the carbon contact is at the bottom. As a result I am able to distribute the current equally over the whole surface of the zinc element and insure the uniform consumption of the metal. In one of my earlier patents, dated August 26, 1890, No. 435,346, I have shown the contact centrally arranged vertically relatively to the zinc plate, but experience has shown that the central contact produced a strong local action. By providing a double contact, I am able to obtain a great amount of current with the same exposed surface; and in case one of the contacts is by any accident, rendered useless the action of the battery is but slightly affected as the other terminal remains in operation.

Electrolytic solutions of any appropriate character used in batteries of this kind may be employed, but I prefer to use in the porous cup a solution consisting of three parts of sulphuric acid, and two parts of water, to which may be added a small amount of nitrate of soda for generating nitric acid. In the cell chamber, outside the porous cup, I prefer to use a solution composed of one part of the sulphuric acid and sixteen to twenty parts of water.

In order to absorb and neutralize the fumes which result from the action of the battery when it is at work, and which are noxious and poisonous, I provide for each separate cell a cork-like stopper having a chamber or reservoir of a peculiar conformation to be hereinafter described, and partially filled with some oxidizing agent. This receptacle or reservoir indicated by H has the side walls $h$ open at the top and provided with a bead $h'$. Integral with the walls $h$ and connected therewith by the bottom ring $h^2$ is an interior upwardly projecting tapering chamber $h^3$ which extends to a point near the upper edge of the walls $h$, and is provided with a small aperture or hole $h^4$. The cross dimensions of the receptacle or reservoir H are such that it fits tightly within the porous cup C. In order to insure its tightly fitting therein, I prefer to use an okonite tape $h^5$. To close the open top of the receptacle, I employ a removable rubber diaphragm T which may be tightly stretched across said top, and slipped over the bead $h'$ which will hold it tightly in place. It will be seen that there is provided by this reservoir, two chambers, one indicated at I within the pyramid or cone and the other at I', being the space between the cone walls $h$ of the receptacle. In this receptacle I place a quantity of absorbent and oxidizing material, such as bichromate of potash, nitrate of ammonia, salts of iron, or any other oxidizing agent known to the art, together with white sand to prevent coagulation. Care should be taken that this material does not extend sufficiently high in the chamber to interfere with the opening in the apex of the inner chamber. The nitrous oxide gas and fumes which arise in the porous cup pass from the chamber I through the aperture $h^4$ into the chamber I' where they are oxidized by the bichromate of potash or other oxidizing agent therein contained. This stopper reservoir or receptacle also prevents the absorption of the fumes by the electrolyte, for the reason that the conical chamber I, with its opening $h^4$, are of sufficient capacity to readily carry off the fumes from the inner electrolyte, and it is impossible for them to pass to the outer electrolyte. This reservoir or receptacle not only serves the purpose of oxidizing and absorbing the noxious fumes arising from the porous cup by the action of the battery but also serves as a stopper or cork for the porous cap C to prevent the escape of the electrolyte therefrom. Whenever a battery is used which must be often moved and held at different angles many times in the course of its use, as is the case with a bicycle, or miner's lamp, means must be provided for preventing the spilling of the electrolyte and for preventing the solution inside of the porous cup from flowing over the top of the cup into the cell chambers and thereby allowing the commingling of the weaker and stronger solutions. It will be seen that this cork-like or stopper-like receptacle or reservoir H performs this function. The bottom of this porous cup being hermetically sealed and the aperture $h^4$ at the apex of the cone being so small, the solution will not escape when the battery is tilted, by reason of the atmospheric pressure, as will be understood.

In order to prevent the weaker solution or electrolyte escaping from the battery, I provide a cover $A^2$ having a plate $a^4$ of hard rubber to which is secured in any suitable way a pad $l$ of soft rubber which fits closely inside the casing A, there being rabbets at $a^3$ to receive it, and the plate $a^4$ fitting down tightly upon the top of the walls of the said casing. The plate is held in place by means of thumb screws $m'$ $m'$ passing through apertures in the plates into offsets in the sides of the casing. The cells are connected in series as shown, there being binding posts, at $m, m$ for the insertion of the wires from a fan motor, when the battery is to be used for running a fan; but at times, I prefer to connect them in multiple series as will be understood.

In Fig. 8 I have shown a modified form of battery in which there are but two cells designed especially for a bicycle, or miner's lamp. R designates the reflector of the lamp. In this case the zinc element may be either bent at an angle or it may be as shown a flat plate extending diagonally across the casing and having shoulders fitting in lugs on the electrodes as hereinbefore described.

By constructing the casing of hard rubber or papier maché, and by arranging the elements, as hereinbefore set forth, I can obtain current from ten to twelve ampères, the battery itself weighing a little less than two pounds and capable of burning a lamp of low voltage,—say three volts for twelve hours.

What I claim is—

1. A primary battery having a positive element provided with two terminal projections, and two negative terminals embedded in the battery casing and terminating in exposed contacts located within the battery casing and below the upper edge of said positive element, and having each a separable contact with one of said terminal projections, substantially as specified.

2. A primary battery, having two negative terminals embedded in the battery casing with exposed contacts located below the upper edge of the positive element, and a positive element having two contact projections at its upper portion arranged to rest upon the exposed portions of said negative terminals, substantially as specified.

3. In a primary battery the combination with the casing provided with inwardly extending ribs, of the terminals embedded in said ribs, and having exposed ends, and the zinc plate having two projections, each contacting with one terminal at its exposed end, substantially as set forth.

4. In a primary battery, a positive plate having a contact projection thereon, and a negative terminal terminating in an exposed contact cup to receive the end portion of said projection, said contact cup being below the upper edge of the positive plate, and an impervious covering for the contacting parts whereby they are protected from the action of the electrolyte, substantially as specified.

5. In a primary battery, a zinc plate having two terminal projections, two negative terminals embedded in the walls of the battery casing and terminating in exposed contacts located within the battery casing, and below the upper edge of said zinc plate, and having each a separable contact with one of said terminal projections, and a carbon element having its terminal contact at the bottom, substantially as specified.

6. The combination with a primary battery having a cover and containing a porous cup, of a reservoir separate from said cover and secured to said cup independently of the cover, and communicating with said cup, and absorbent material in said reservoir, substantially as specified.

7. The combination with a primary battery, containing a porous cup, two generating elements and two solutions, one for each generating element, of a liquid-tight stopper covering the porous cup, said stopper having an oxidizing chamber therein communicating with the porous cup, said stopper being arranged to prevent the fumes from said cup coming in contact with the outer electrolyte of the battery, substantially as specified.

8. In a primary battery, the combination with a porous cup, of a stopper therefor having two communicating chambers, one of which opens into the cup, the other of said chambers having a filling of absorbent and oxidizing material, substantially as specified.

9. The combination with a primary battery having a porous cup, of a reservoir secured thereabove and having a receiving chamber for the fumes and a chamber for the absorbent agent, said chambers being communicating substantially as set forth.

10. The combination with a primary battery having a cover, of a two part reservoir, supplemental to the cover, having two concentric communicating chambers, one of which is charged with absorbent material and the other of which opens into the porous cup of the battery, substantially as set forth.

11. The combination with a primary battery of a reservoir above the electrolyte in the porous cup having two communicating chambers, one of which is tapering with an aperture in its apex leading into the other of said chambers, said other chamber being charged with absorbent material, said tapering chamber opening into the porous cup of the battery, substantially as set forth.

12. The combination with the casing having an aperture in its bottom, of a porous cup having a recess in its bottom, a carbon having a boss fitting in said recess in said cup and a terminal passing through said aperture and secured in said boss, substantially as set forth.

13. A primary battery having a porous cup, a carbon secured in said cup, and a coating of a suitable japan, such as a mixture of beeswax and asphalt, between the meeting surfaces of said carbon and cup, said japan being baked, substantially as specified.

14. A primary battery having a porous cup, a carbon element secured in said cup, and suitable japan such as a mixture of asphalt and beeswax between the meeting faces of said carbon and cup and around the lower portion of the carbon, said japan being baked to render it impervious to the attacks of the electrolyte and to prevent leakage and capillary action, substantially as specified.

In testimony whereof I affix my signature in presence of two witnesses.

CHARLES JONES HUBBELL.

Witnesses:
   CHAS. W. LA PORTE,
   WILLIAM E. NEFF.